United States Patent [19]

Eldridge, Jr.

[11] Patent Number: 4,638,681
[45] Date of Patent: Jan. 27, 1987

[54] REPLACEMENT LEVER

[75] Inventor: John D. Eldridge, Jr., Newport Beach, Calif.

[73] Assignee: Jodel Associates, Inc., Newport Beach, Calif.

[21] Appl. No.: 767,139

[22] Filed: Aug. 19, 1985

[51] Int. Cl.$^4$ .............................................. G05G 7/12
[52] U.S. Cl. ..................................... 74/544; 74/548; 403/11; 403/17
[58] Field of Search .............. 74/544, 548; 98/2, 41.3; 403/17, 11, 3

[56] References Cited

U.S. PATENT DOCUMENTS 3,159,049 12/1964 Lahti ..................................... 74/544

Primary Examiner—Larry I. Schwartz
Attorney, Agent, or Firm—Knobbe, Martens, Olson & Bear

[57] ABSTRACT

A control lever for an automobile which is used to replace original equipment levers without requiring the removal of the dashboard. A preferred embodiment of the present invention includes a fork-shaped insert member slidable within a lever body, the insert having a pair of tines which are passed through a slot in the dashboard to engage a rotor plate behind the dashboard. By passing a screw through the lever body and threading it into the insert member from the front of the dashboard, the lever body and insert members are drawn together to clamp onto the rotor plate, securing the lever in place. Lateral movement of the lever within the slot will rotate the rotor plate, in order to select a desired function. Also disclosed is a method of replacing a climate control lever without removing the dashboard.

14 Claims, 11 Drawing Figures

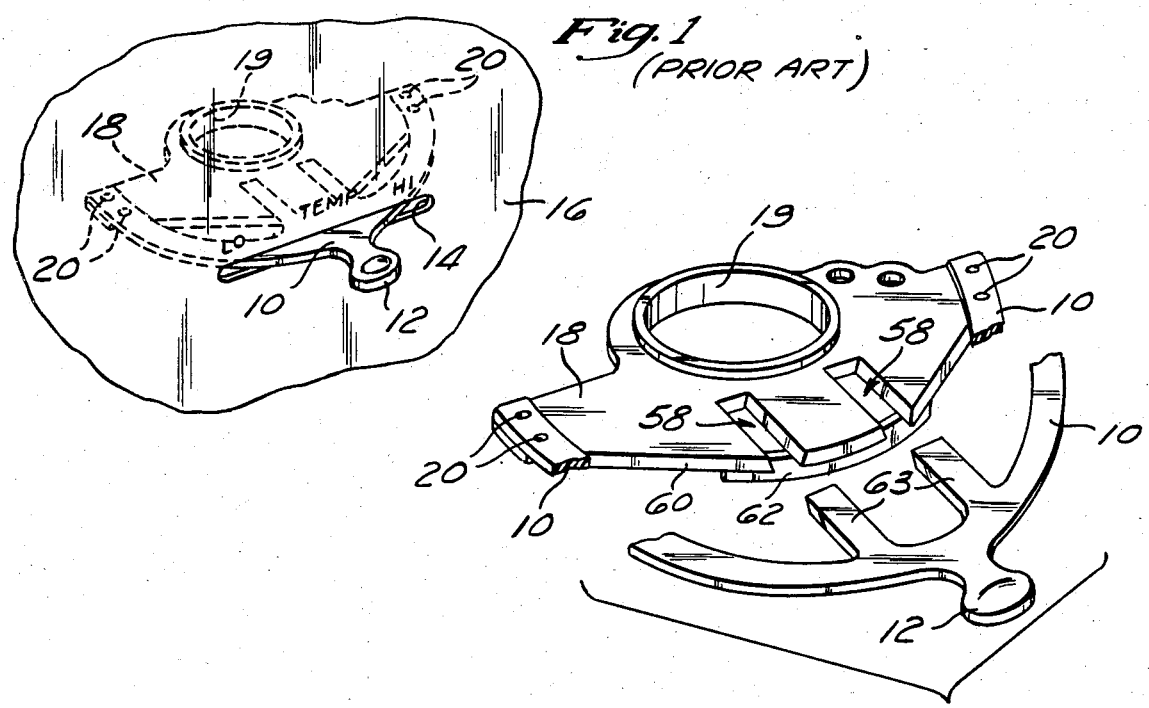
Fig. 1 (PRIOR ART)
Fig. 2 (PRIOR ART)
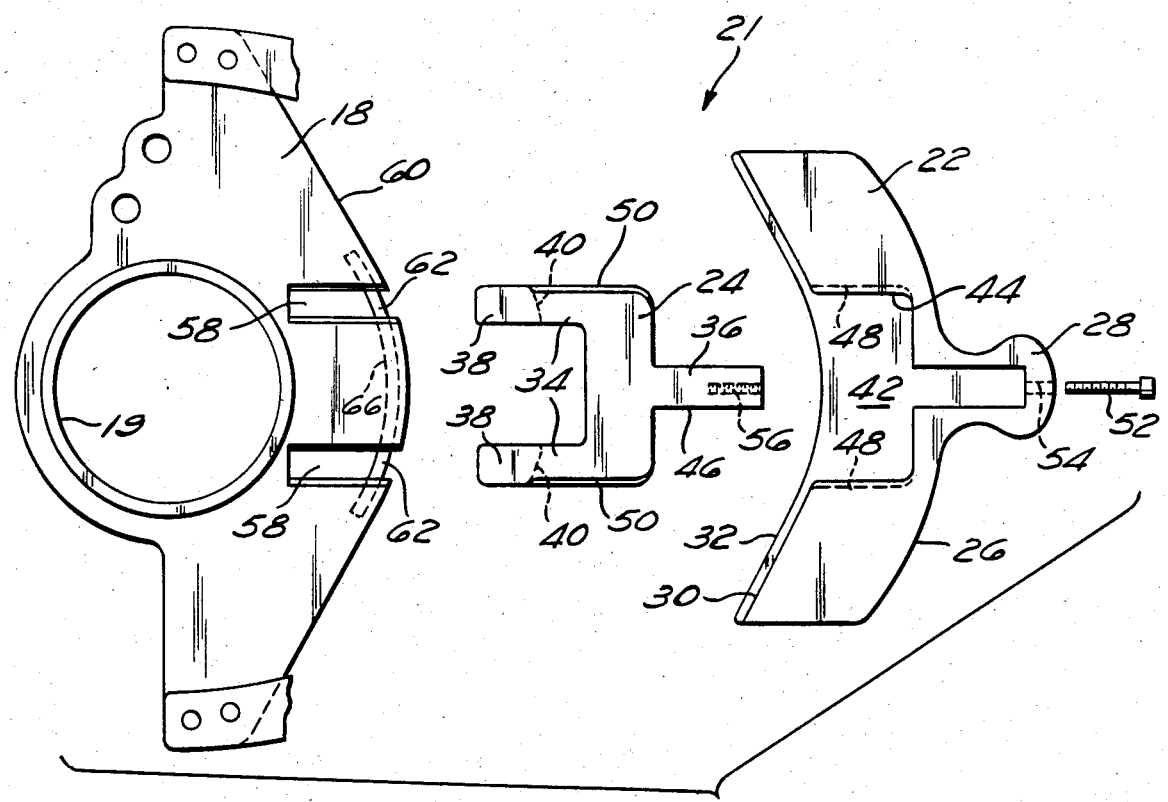
Fig. 3

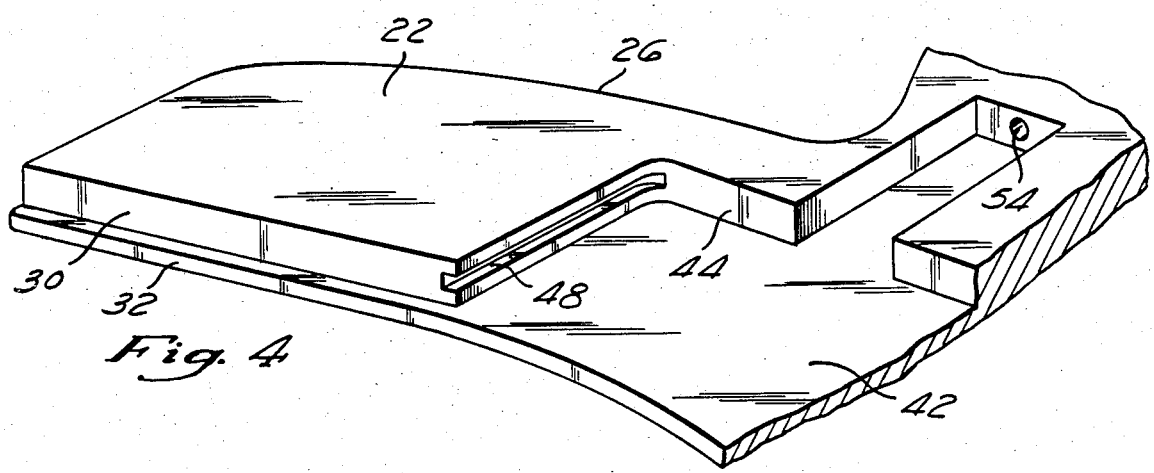
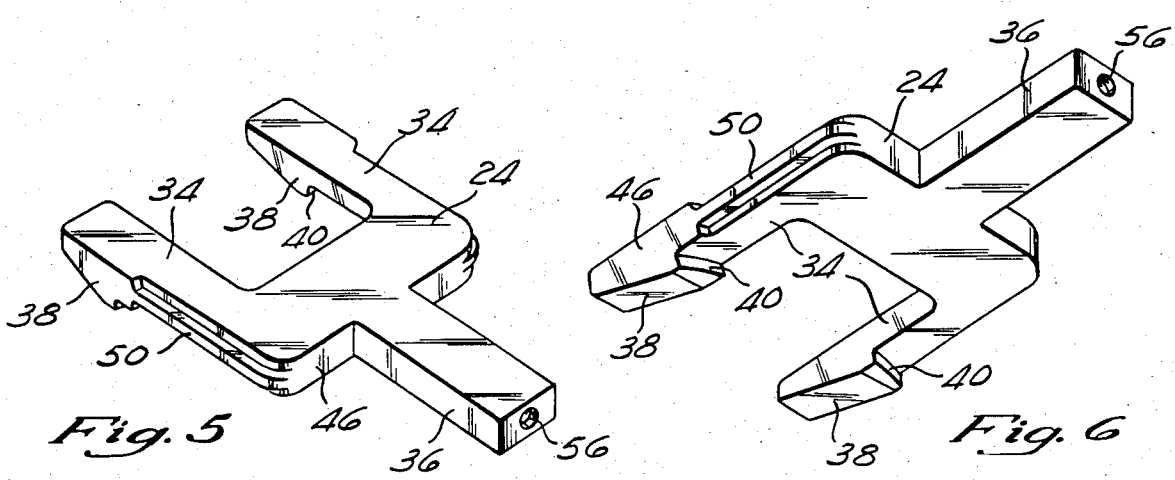
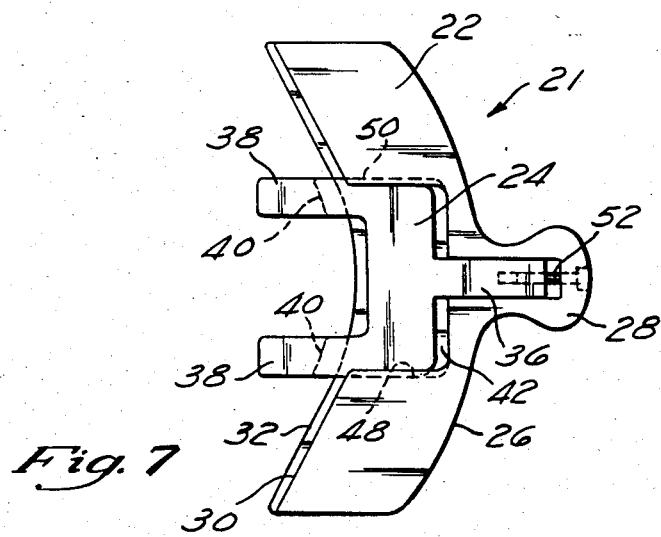

U.S. Patent  Jan. 27, 1987  Sheet 3 of 3  4,638,681
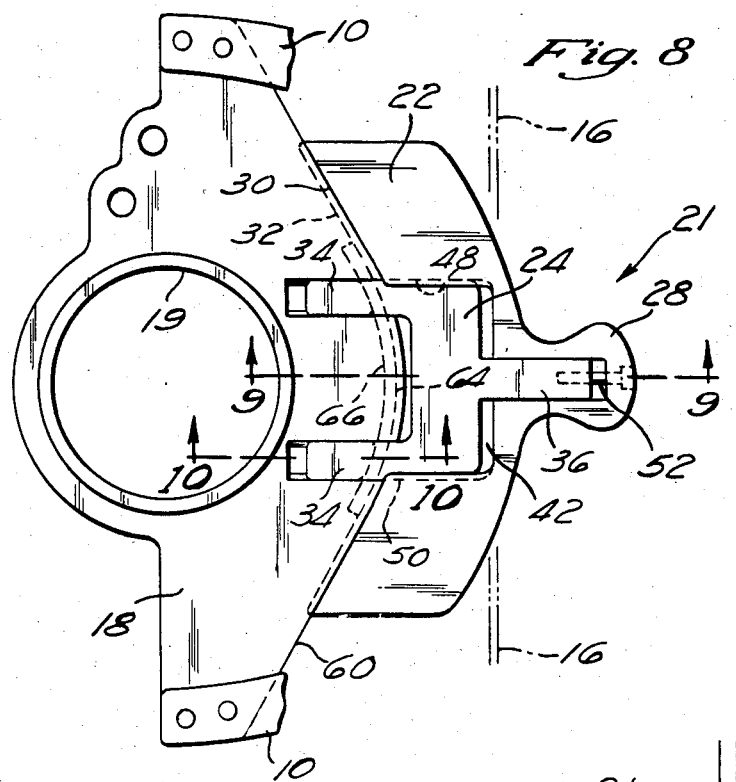
Fig. 8
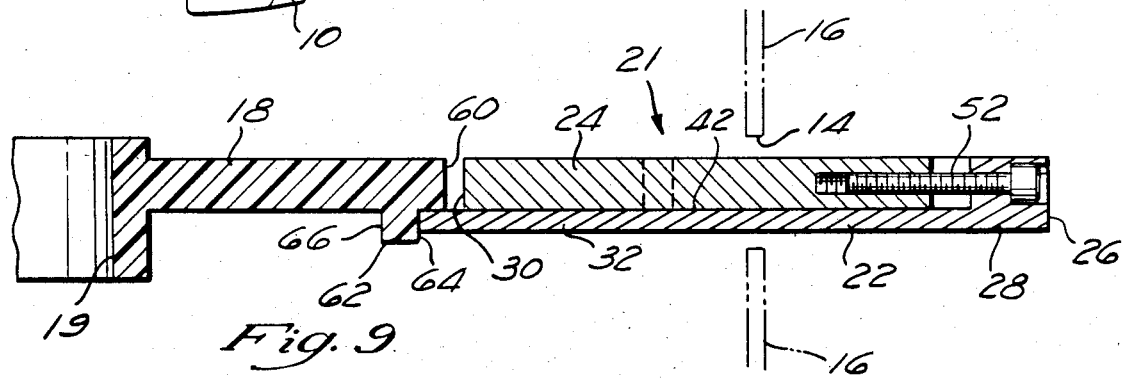
Fig. 9
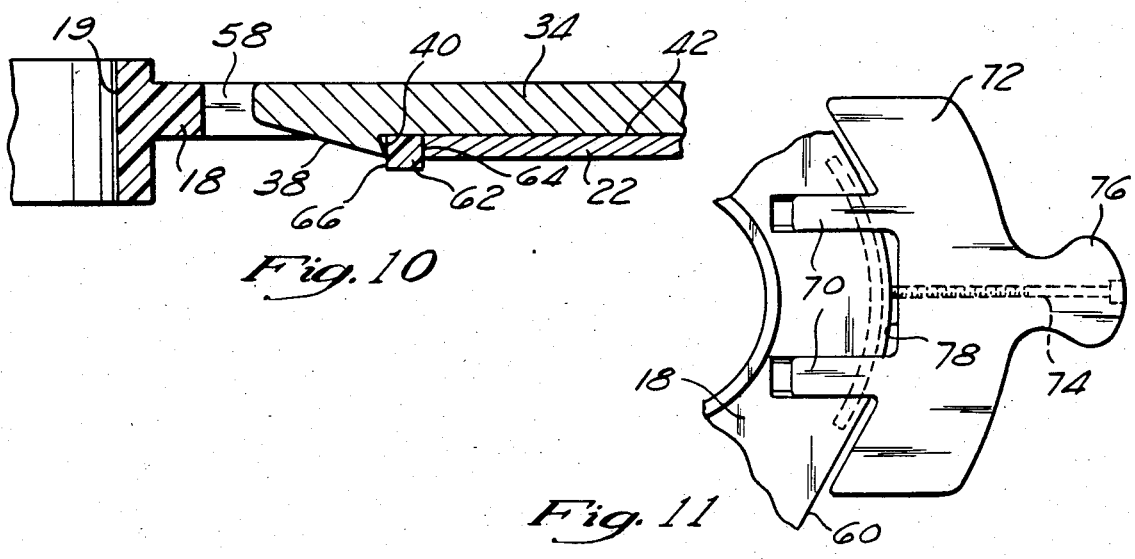
Fig. 10
Fig. 11

4,638,681

REPLACEMENT LEVER

BACKGROUND OF THE INVENTION

This invention relates generally to replacement parts for automobiles, and more particularly to a lever which is used to replace an original equipment control lever which has broken and is inoperable.

The term "control lever" is used herein to refer to a lever which protrudes through a narrow slot in an automobile dashboard for use in connection with a control function, such as heater, defroster, or temperature level. These levers typically are attached to mechanisms located behind the dashboard which open and close appropriate vents through a network of cables when rotated by the lateral movement of the lever.

A problem arises when an original equipment control lever supplied by the automobile manufacturer breaks away from the mechanism or "rotor plate" behind the dashboard. in some automobiles, and in particular, the model year 1968-1973 Mercedes Benz automobiles, the entire dashboard must be removed in order for the entire unit consisting of the rotor plate and the broken lever to be replaced, since the lever alone is not available from the manufacturer. Even if a lever were available separately, it would be impossible to reattach the lever to the rotor plate without removing the dashboard to gain access to the rotor plate. Removal of the dashboard and replacement of the lever and rotor plate with another original equipmenttype unit is a time-consuming task requiring the labor of a highly-paid mechanic. As a result, the cost of repairing a broken lever is inordinately high in light of the low cost of the small, molded plastic, original equipment lever.

Thus, a need exists for an inexpensively produced replacement control lever which can be quickly and easily attached to the original equipment rotor plate without necessitating removal of the dashboard.

SUMMARY OF THE INVENTION

Briefly, the present invention comprises a control lever which is installed through a narrow slot in an automobile dashboard. In the preferred embodiment, the lever is substantially planar and includes a knob which protrudes out of the dashboard slot when installed to enable the lever to be manipulated. The lever also includes a device for securing the lever to a member located behind the dashboard, such as a rotor plate of a climate control mechanism. Sliding the lever laterally within the slot will move the rotor plate behind the dashboard so as to select a climate control function. The securing means is controlled from the front of the dashboard, so that the dashboard does not have to be removed to install a new lever.

In the preferred embodiment, the securing means is adapted to engage a rotor plate of the type utilized on the climate control mechanism of 1968-73 Mercedes automobiles, such that the plate can be rotated by sliding the lever laterally within a slot in the dashboard. The rotor plate is generally planar and includes two, parallel, elongated slots extending inwardly from the edge of the portion of the rotor plate which is adjacent the dashboard. A raised step member on the rotor plate is spaced from the edge and extends across the slots.

In the preferred embodiment, the securing device includes a pair of elongated, parallel tines which are normal to the dashboard when the lever is centered within the dashboard slot. The end of each tine includes a tooth which hooks onto the raised step of the rotor plate to prevent the lever from being pulled away from the rotor plate and out of the dashboard slot.

The lever is preferably formed from a two piece assembly, comprised of an insert member and a main lever body. The tines protrude from the fork-shaped insert member, which also has an elongated neck. The insert is slidable within a recessed portion on the lever body and the recessed portion has side walls that conform to the outer contour of the insert. Keys protruding from the periphery of the insert and mating grooves on the side walls of the recessed portion maintain the insert and lever body within the same plane as the insert slides within the lever body. The lever body and insert are adjustably fastened together to control how far the insert slides into the lever body. In one preferred embodiment, the insert member is fastened to the body by means of a screw which is slideable through the knob and which threads into the neck of the insert member so that rotation of the screw forces the insert member into or out of the body.

To install the lever, the tines are inserted through the dashboard slot and positioned within the rotor plate slots so that the teeth on the tines hook into a surface of the step which faces toward the rotational axis of the rotor plate. The insert is then slid further into the lever body by adjusting the fastening means so that the body will be drawn into contact with the edge of the rotor plate, thus clamping the rotor plate between the teeth on the tines and the body.

In the preferred embodiment, the edge of the lever body which contacts the rotor plate is curved to conform to the edge of the rotor plate, which is also curved. The edge of the body also includes a shoulder which protrudes past the curved rotor plate edge and abuts the step on the rotor plate. The teeth on the end of the tines are sharply angled to form a point which digs into the step on the rotor plate so as to provide a gripping action to further secure the lever to the rotor plate.

BRIEF DESCRIPTION OF THE DRAWINGS

FIG. 1 is a perspective view of a prior art automobile manufacturer's original equipment climate control lever, as secured to a rotor plate, shown in broken lines, located behind a dashboard.

FIG. 2 is a perspective view of a lever in FIG. 1, after the lever has broken away from the rotor plate.

FIG. 3 is an exploded plan view of a rotor plate and a first preferred embodiment of the present invention, including an insert member, lever body and screw.

FIG. 4 is a partial perspective view of the lever in FIG. 3.

FIG. 5 is a top perspective view of the insert member in FIG. 3.

FIG. 6 is a bottom perspective view of the insert member in FIG. 3.

FIG. 7 is a plan view of the lever body and insert member of FIG. 3 as assembled.

FIG. 8 is a plan view of the lever body, insert member, and rotor plate of FIG. 3, as assembled.

FIG. 9 is a cross-sectional view of the assembly in FIG. 8, taken along lines 9—9.

FIG. 10 is a cross-sectional view of the assembly in FIG. 8, taken along lines 10—10.

FIG. 11 is a partial plan view of a rotor plate secured to a lever according to a second preferred embodiment of the invention.

DETAILED DESCRIPTION OF THE PREFERRED EMBODIMENT

FIG. 1 shows an original equipment climate control lever 10 as provided on model year 1968–1973 Mercedes Benz automobiles. A knob 12 on the lever 10 protrudes through an elongated, narrow slot 14 in the dashboard 16. The lever 10 is secured to a rotor plate 18, located behind the dashboard 16, by means of rivets 20 on either side of the rotor plate 18. The rotor plate 18 is substantially planar, and is oriented to lie in a horizontal plane. The rotor plate 18 is rotatable within that plane, about an axis of rotation located at the center of circular hole 19. The elongated sides of the slot 14 are oriented parallel to the horizontal plane of rotor plate 18, so that sliding the lever 10 laterally within the slot 14 causes rotation of the rotor plate 18, which, through a network of cables (not shown), results in the selection of a desired climate control feature, such as those indicated on the dashboard 16.

The rotor plate 18 shown in FIG. 1 is original equipment on 1968–1973 Mercedes Benz autos. It includes a pair of elongated slots 58 which extend inwardly from a curved, arc-shaped edge 60 on the rotor plate 18 which is adjacent the dashboard 16. The edge 60 curves away from the dashboard 16 so that, upon rotation, the sides of the rotor plate 18 through which the rivets 20 pass will not be obstructed by the dashboard 16. A raised step member 62 is spaced from the edge 60 and follows the curvature of the edge 60. The step 62 also extends across each of the slots 58. The lever 10 includes a pair of tines 63 which are inserted within slots 58 to prevent lateral motion of the lever 10 relative to the rotor plate 18.

The molded plastic original equipment lever 10 will sometimes break away from the rotor plate 18, as shown in FIG. 2. However, a portion of the lever 10 usually remains riveted to the rotor plate 18. Thus, to replace a broken lever 10 with another lever of the same type, the dashboard 14 must be removed to allow access for the removal of the rotor plate 18 so that a new rotor plate having an attached lever can be installed together as a unit behind the dashboard.

FIG. 3 shows a first preferred embodiment of the present invention, a lever 21 formed from an assembly which includes a substantially flat, planar main lever body 22 and substantially flat, planar fork-shaped insert member 24. The lever body 22 has a front edge 26 which is arcuately curved to allow the lever body 22 to rotate with the rotor plate 18 in the slot 14 without obstruction from the dashboard 16. The body 22 also includes a knob 28 which protrudes through the slot 14 in the dashboard when the lever 21 is installed, to allow the lever 21 to be manipulated. The lever body 22 also has a rear edge 30 which is curved along an arc, and a shoulder 32 which extends beyond the rear edge 30.

The insert member 24 includes a pair of elongated, parallel tines 34 and an elongated neck portion 36. As is best shown in FIG. 6, a raised portion or tooth 38 is located at the end of each tine 34. The teeth 38 are angled to form a sharp point along ridges 40, which point away from the ends of the tine 34, and towards the neck 36.

As shown in FIG. 4, one of the planar sides of the lever body 22 has a large, centrally-located recessed portion 42 which has side walls 44 that are contoured to the outline of the neck 36 and a portion of the tines 34 defined by the outer side walls 46 of the insert 24. The recessed portion side walls 44 are oriented so that the longitudinal axis of the tines 34 and neck 36 are normal to the edges 30 of the body 22. Referring to FIGS. 4–6, grooves 48 are cut into the side walls 44 of the recessed portion 42, and keys 50 protrude from the sides 46 of the insert member 24. The keys 50 and the grooves 48 mate to allow the insert member 24 to slide within the recessed portion 42 so that the insert 24 and body 22 may be assembled with the insert 24 nesting within the recessed portion 42, as in FIG. 7. While assembled, the keys 50 and grooves 48 also maintain the insert member 24 oriented within the same plane as the body member 22. When oriented for insertion into the dashboard slot 16, the insert 24 and body 22 are thin enough to pass through the dashboard slot 16, either individually or as assembled.

The insert member 24 and the lever body 22 are adjustably fastened together in an assembled state by a set screw 52 which slides through an unthreaded passage 54 in the knob 28 and threads into the insert member 24 through a hole 56 having an opening at the end of the neck 36. The hole 56 extends through the neck 36 along the longitudinal axis of the neck 36. Since the passage 54 is unthreaded, the head of the screw 52 abuts the front edge 26 of the body 22. By threading the screw 52 into or the hole 56 in the insert member neck 36, the insert member 22 will be slideably drawn into the recessed portion 42 of the body 24. The insert 24 and body 22 may alternatively be fastened together by a spring (not shown), which would also allow the insert 24 to be adjustably drawn into and out of the recessed portion 42.

The dashboard need not be removed to install the lever 21, and no tools other than a screwdriver are required. The installation procedure is relatively simple and can be accomplished in a matter of minutes by a layman. First, the insert member 24 is slid into the recessed portion 42 of the lever body 22, and the screw 52 is slid through the passage 54 in the knob 28 and partially threaded into the hole 56 within the insert member 24. The tines 34 are then passed through the dashboard slot 16 and positioned within the rotor plate slots 58 as in FIG. 10, so that the teeth 38 abut the rear face 66 of the raised lip 62, the rear face 66 being the edge surface of the step 62 which faces towards the axis of rotation of the rotor plate 18. The screw 52 should be partially threaded into the neck 36 so that the insert member 24 extends out of the lever body 22 sufficiently to permit the shoulder 32 to be spaced from the step 62 in the direction of the dashboard 16.

From the front side of the dashboard 16, the screw 52 is then threaded further into the insert member 24 to draw the insert member 24 and lever body 22 closer together, until the shoulder 32 abuts the front face 64 of the step 62, as shown in FIG. 9. The front face 64 is that edge surface on the step 62 which faces away from the axis of rotation of the rotor plate 18. The rear arcuate edge 30 of the lever body 22 conforms to and is evenly spaced from the edge 60 of the rotor plate 18 along the length of the edge 30. The corresponding curved shapes of the edges 30 and 60 allow the shoulder 32 to extend past the rotor plate edge 60 and, continually abut the front face 64 of the step 62. As a result, the rotor plate 18, and step 62 in particular, is clamped between the shoulder 32 of the lever body 22 and the teeth 38 of the insert member 24, so that the lever 21 is rigidly fastened to the rotor plate 18 and cannot be pulled away from the rotor plate 18 through the dashboard slot 14. The further the screw 52 is threaded into the insert 24, the more tightly the lever 21 will be clamped to the rotor plate 18.

The lever 21 is prevented from vertical motion relative to the rotor plate 18 by the gripping action of the pointed teeth 38 rear face 66 of the step 62, and by the shoulder 32 which overlaps the edge 60 of the rotor plate 18 to contact both the front face 64 of the step 62 and one planar side 67 of the rotor 18. Also, the tines 34 fit snugly within the slots 58 so that lateral motion of the lever 21 relative to the rotor plate 18 is prevented.

Once installed, the knob 28 protrudes out of the dashboard slot 14 to allow the lever 22 to be manipulated to select a desired climate control function. Preferably, the knob 28 is shaped and colored similarly to the knob 12 on the original equipment lever 10, so as to conform with the appearance of adjacent original equipment levers. The lever 21 is easily detached from the rotor plate 18 by unthreading the screw 52 from the hole 56 in the insert 24, which allows the insert 24 to slide out of the recessed portion 42 and relieve the clamping action of the lever 21 on the rotor plate 18.

A second preferred embodiment of the present invention is shown in FIG. 11. In this embodiment, a pair of tines 70 are integral with a lever 72, the tines being shaped similarly to the tines 34 of the first embodiment, and including teeth 38. An elongated screw 74 extends through a knob 76, formed on the lever 72. The screw 74 protrudes out of the rear edge 78 of the lever 72 and contacts the curved edge 60 of the rotor plate 18. By threading the screw 74 further into the lever 72, the lever is pushed farther away from the edge 60 of the rotor plate 18, causing the tines 70 to abut against the raised lip 62. The lever 72 thus clamps onto the rotor plate 18 between the teeth 38 and the screw 74. Alternatively, the screw 74 may be self threading, and thread into the rotor plate 18 to secure the lever 72 to the rotor plate 18. In this instance, the tines 70 would, mainly serve to provide lateral support as the lever 72 rotates the rotor plate 18.

What is claimed is:

1. A replacement control lever for attachment to a movable member behind a slot in an automobile dashboard, without removing said dashboard, said lever comprising:
   a main lever body having a knob for manipulating the lever within the slot in the dashboard;
   an insert member for securing said main lever body to said movable member; and
   means for adjustably fastening said insert and said main lever body together from the front of the dashboard, said fastening means drawing said insert member toward said main lever body to clamp said movable member between the insert member and the main lever body, to allow installation of said lever without removal of the dashboard.

2. The lever of claim 1, wherein said fastening means comprises a screw which passes through said knob and threads into a hole within said insert member.

3. The lever of claim 1, wherein said movable member is a rotor plate which includes a pair of parallel slots extending inwardly from an outer edge adjacent the dashboard, and a step member spaced from said rotor plate edge and extending across said slots, said step member including a surface facing towards the rotational center of said rotor plate, said insert member comprising:

a pair of elongated, parallel tines extending from said lever, said tines mating with said rotor plate slots; and a tooth at the end of each tine, for hooking onto said surface of said step member to prevent the lever from being pulled away from the rotor plate.

4. The lever of claim 3, wherein said main lever body further comprises a shoulder which abuts said step member and overlaps said rotor plate to inhibit vertical motion of said lever relative to said rotor plate.

5. The lever of claim 4, wherein said teeth are angled to form points which are adapted to dig into said step member.

6. A replacement control lever which can be installed in an automobile without removing the automobile's dashboard, said lever being secured to a rotor plate rotatably positioned behind a slot in the dashboard, said rotor plate including a pair of parallel slots extending inwardly from an arcuate edge adjacent the dashboard, and a raised step member spaced from said edge, said step member including a rear edge surface which faces toward the axis of rotation of said rotor plate, said lever comprising:
   a main lever body having a knob for manipulating the lever, said knob protruding out of the dashboard slot when said lever is installed, said lever including a recessed portion on one side and a curved edge which abuts the edge of the rotor plate;
   an insert member slidable within said recessed portion and fastened to said lever body by means of a screw passing through said knob, said screw threading into said insert member; and
   a pair of parallel tines extending from said insert member, said tines adapted to mate within said slots in said rotor plate, the ends of said tines having raised teeth to grip said rear edge surface of said step member, said lever being secured onto said rotor plate by threading said screw into said insert member so as to draw said insert member and said lever body closer together to clamp said rotor plate between said teeth and said lever body edge.

7. The lever of claim 6, wherein said step member includes a front edge surface facing away from said axis of rotation, said lever body includes a shoulder which protrudes beyond said curved edge, said shoulder engaging said front edge surface and overlapping said rotor plate to inhibit vertical motion of said lever relative to said rotor plate.

8. The lever of claim 6, wherein the sides of said recessed portion and the sides of said insert member include mating grooves and keys which maintain said insert and said lever body oriented within a common plane while said insert is within said recessed portion.

9. The lever of claim 6, wherein said teeth are angled to form pointed ridges which engage said step and provide a gripping action.

10. A replacement lever in an automobile having a dashboard, said lever being secured to a mechanism located behind a narrow slot in said dashboard, said lever being sized for passage through said opening from the front of said dashboard, said lever including means for contacting a surface on said mechanism, and mechanical means for biasing said contacting means into tight engagement with said surface to secure said lever to said mechanism without requiring the removal of said dashboard, wherein said mechanical means comprises a screw which applies a biasing force on said mechanism.

11. A replacement lever in an automobile having a climate control mechanism operable by means of a lever, said mechanism including a rotor plate having (1) a surface which faces generally outwardly away from the rotational center of said plate, and (2) a surface between the outer edge of said plate and the center of said plate which faces generally inwardly towards the center of said plate, said motor plate mounted behind a small opening in the dashboard of said automobile such that removal of said dashboard is necessary for access to said plate to replace said lever, said replacement lever attaching to said rotor plate without removing said dashboard, said replacement lever comprising:

an insert member, sized for passage through said small opening, said insert member including means for engaging said inwardly facing surface on said rotor plate;

a main lever body for attachment to said insert member, said main body member having a surface for bearing against said outwardly facing surface of said rotor plate; and means for driving (1) said insert member against said inwardly facing surface and (2) said main lever body against said outwardly facing surface to clamp said rotor plate between said insert member and said main lever body.

12. A method of replacing a control lever in an automobile having a dashboard, said lever being secured to a mechanism behind a slot in said dashboard without necessitating the removal of said dashboard, wherein said lever is formed from a main lever body and an insert slidable within said lever body, said insert having teeth, said method comprising:

inserting said lever through said dashboard slot;

engaging said teeth against a surface on said mechanism;

mechanically biasing said teeth against said surface by drawing said insert into said lever body to secure said lever to said mechanism.

13. The method of claim 12 wherein said insert is drawn into said lever body by passing a screw through said lever body and threading said screw into said insert.

14. The method of claim 12 wherein said mechanism is a rotor plate having a pair of elongated, parallel slots extending inwardly from a curved edge and having a raised step member extending across said slot, said lever being secured to said rotor plate by engaging said teeth against a surface on one side of said step, and biasing said insert into said lever body so that the edge of said lever body abuts the edge of said rotor plate to clamp the rotor plate between the teeth and the lever body.

* * * * *